United States Patent
De Luca et al.

[15] 3,697,559
[45] Oct. 10, 1972

[54] 1,25-DIHYDROXYCHOLECALCIFEROL

[72] Inventors: Hector F. De Luca, Madison; Heinrich K. Schnoes, Waunakee; Michael F. Holick, Madison, all of Wis.

[73] Assignee: Wisconsin Alumni Research Foundation, Madison, Wis.

[22] Filed: Feb. 25, 1971

[21] Appl. No.: 118,881

[52] U.S. Cl. .............................................. 260/397.2
[51] Int. Cl. ............................................. C07c 171/08
[58] Field of Search .................................. 260/397.2

[56] References Cited

UNITED STATES PATENTS 3,565,924  2/1971  De Luca et al. ......... 260/397.2
3,585,221  6/1971  De Luca ................. 260/397.2

*Primary Examiner*—Elbert L. Roberts
*Attorney*—Howard W. Bremer

[57] ABSTRACT

1,25-Dihydroxycholecalciferol. The compound is characterized by antirachitic activity (vitamin D-like activity) and by its high activity in promoting intestinal calcium absorption indicating a more rapid onset of antirachitic activity.

1 Claim, 4 Drawing Figures

INVENTORS
H. F. DE LUCA, H. K. SCHNOES
& M. F. HOLICK
BY
Howard W Bremer
ATTORNEY

1,25-DIHYDROXYCHOLECALCIFEROL

The invention described herein was made in the course of work under a grant or award from the Department of Health, Education, and Welfare.

This invention relates to a compound which is characterized by antirachitic activity and by its ability to rapidly induce intestinal calcium absorption.

More specifically, this invention relates to a derivative of vitamin $D_3$.

The character and activity of the D-vitamins (vitamin $D_3$ and $D_2$) is well known. More recently certain derivatives of the D-vitamins have been found to have even greater activity than the D-vitamins themselves. (See applications for U.S. Letters Patent Ser. Nos. 741,239, filed July 1, 1968, and 809,541, filed Mar. 24, 1969.) It is now believed that other derivatives of the D-vitamins, and more specifically of vitamin $D_3$, are specifically active at certain sites within the normal body for inducing and promoting certain specific functions.

A derivative of vitamin $D_3$ has now been found which exhibits antirachitic properties and which acts much more rapidly than either vitamin $D_3$ or 25-hydroxycholecalciferol (25-HCC) in inducing intestinal calcium absorption. This derivative has been identified as 1,25-dihydroxycholecalciferol.

ISOLATION

Fourteen hundred and fifty chicks were maintained in cages at 38° C, shielded from ultraviolet light and for 4 weeks were fed a vitamin D-deficient diet of the following composition, all values given being in weight percent:

| | |
|---|---|
| soy protein | 25.6 |
| sucrose | 56.0 |
| DL-methionine | 0.6 |
| glycine | 0.4 |
| cellulose | 3.0 |
| cottonseed oil | 4.0 |
| $CaHPO_4$ | 0.52 |
| $K H_2 PO_4$ | 1.55 |
| $CaCO_3$ | 2.28 |
| NaCl | 0.8 |

Trace amounts of other salts and vitamins were also added to the diet as reported by Imrie et al. in Arch. Biochem. Biophys., 120, p. 525, (1967).

Each chick was then dosed with 2.5 μg of $(1,2-^3H)$-vitamin $D_3$ (Specific Radioactivity of 8,000 dpm/0.025 μg) orally in 0.2 ml of Wesson oil (a blend of cottonseed and soybean oil). Twenty-four hours later the chicks were killed and the entire small intestine was excised. The excised intestine was flushed with ice-cold distilled water and rapidly frozen on solid $CO_2$. The frozen intestines (12.5 kg) were homogenized in methyl alcohol (2 parts methanol to 1 part intestine V/W). One part by volume of chloroform was added and the homogenate was then stored for 48 hours under a nitrogen atmosphere at 37° F.

The homogenate was then filtered and the protein precipitate was re-extracted with a solution of methanol and chloroform (2:1) for 24 hours. The filtrates from the first extraction and the re-extraction were combined and one part chloroform, 1 part distilled water and 0.05 parts saturated NaCl solution (by volume) were added to effect a phase separation. The chloroform phase was separated as the lower layer was removed and washed with distilled water for 2 days as described in Suda et al., Biochemistry, 9, 2917 (1970).

The washed chloroform phase was concentrated to about 500 ml with a rotary flash evaporator and the resulting yellow oil partitioned between Skellysolve B and 90 percent methanol in water as described in the Suda et al. publication above. (Skellysolve B comprises essentially normal hexane derived from petroleum oil and marketed by Skelly Oil Company, having a boiling point of 67°–69° C.)

The aqueous phase was removed and extracted twice with chloroform. The chloroform phases from each extraction were combined and concentrated by Flash evaporation to give approximately 30 ml of yellow oil.

It was earlier found that column chromatography with a Sephadex LH–20 column (Sephadex LH–20 is a hydroxypropyl ether derivative of a polydextran marketed by Pharmacia Fine Chemicals Inc., Piscataway, N.J.) afforded an excellent separation technique for isolating various metabolites of vitamin $D_3$. Consequently, the yellow oil obtained as indicated above was chromatographed in three separate runs on a Sephadex column as described below.

Figure 1:
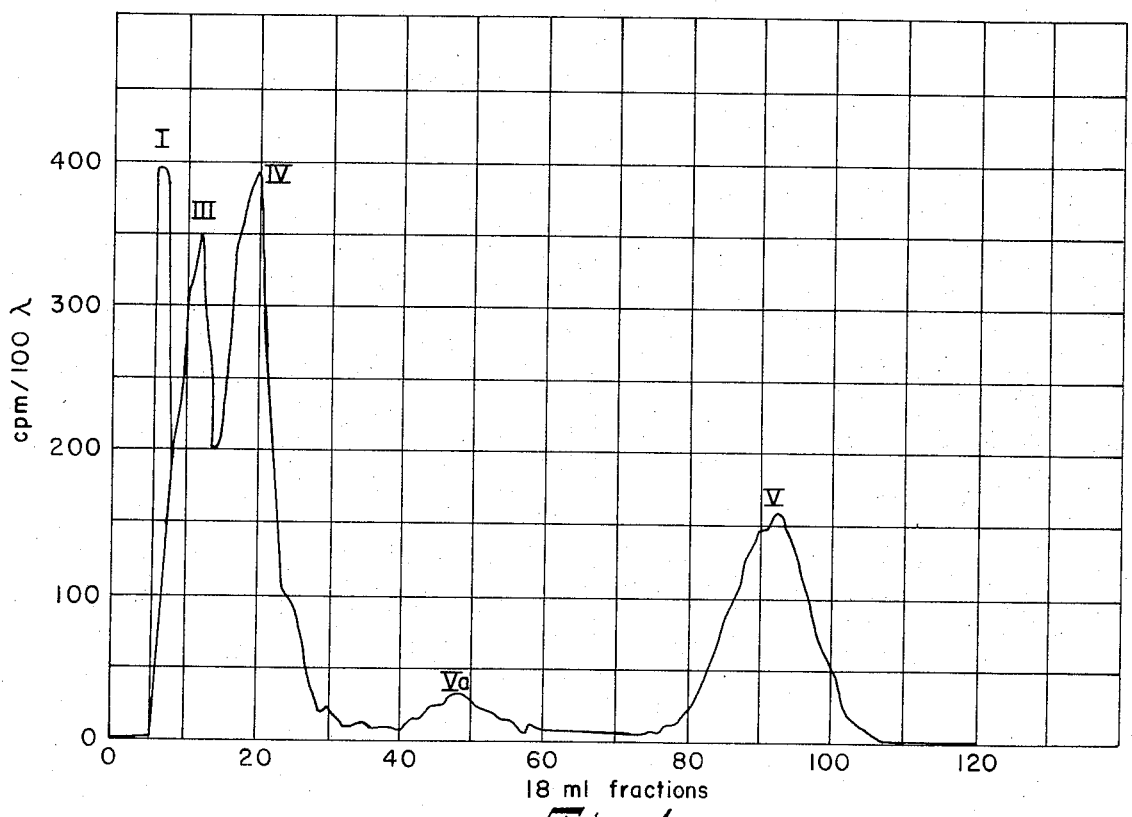
FIG. 1 is the radioactive profile of the intestinal lipid extract obtained from chicks dosed with $^3H$ vitamin $D_3$ when the extract has been dissolved in 65 percent $CHCl_3$ in Skellysolve B and applied to a 3 × 70 cm column packed with 110 g. of Sephadex LH–20 in 65 percent $CHCl_3$ in Skellysolve B.
Figure 2:
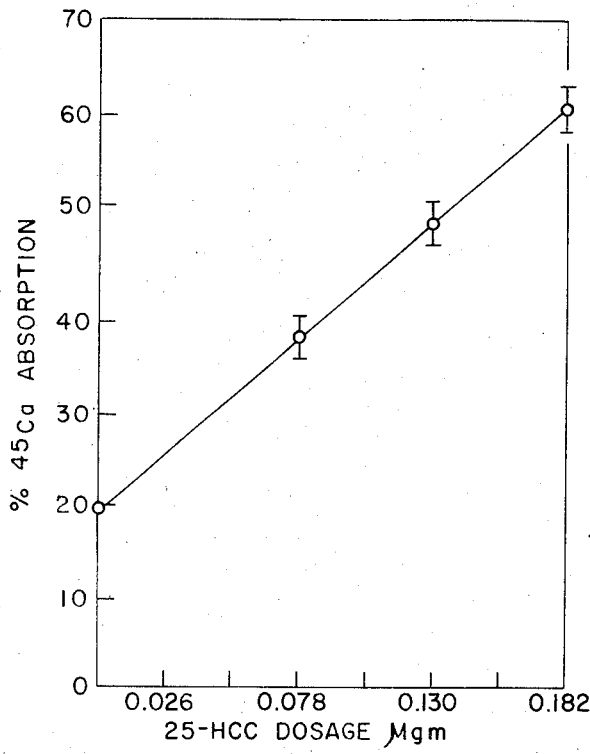
FIG. 2 represents the dose response curve for 25–HCC and calcium absorption in chicks. Each point represents six chicks and the vertical bars represent standard error.

Ten ml of the yellow oil was dissolved in 20 ml of 65 percent chloroform in Skellysolve B and applied to a 3 × 70 cm glass column packed with 110 g of Sephadex LH–20 in 65 percent $CHCl_3$ in Skellysolve B. One hundred-eighteen ml fractions were collected and 100 μl of each fraction was counted for radioactivity to determine the radioactivity profile of the extract which is shown in FIG. 1. (All determinations of radioactivity were carried out by means of a Packard Tri-Carb Model 3375 liquid scintillation counter equipped with an automatic external standardization system. Samples to be counted were evaporated to dryness with a stream of air, dissolved in toluene counting solution (2 g. of 2.5-diphenyloxazole and 100 mg 1,4-bis-[2(4-methyl-5-phenyloxazolyl) benzene] per liter of toluene) and counted.

For purposes of this invention the eluted material, identified by peak V in FIG. 1, is the desired material since its activity, as shown hereinafter, indicates that it contains the specific derivative (metabolite) of vitamin $D_3$ of this invention. The other peaks of the radioactivity profile in FIG. 1 are identified as follows:

| | |
|---|---|
| Peak I | vitamin D esters with long chain fatty acids |
| Peak III | vitamin $D_3$ |
| Peak IV | 25-HCC |

Peak Va    21,25 dihydroxycholecalciferol

Based upon the specific activity of the metabolite, 11 μg of peak V material was recovered in about 320 mg of yellow oil. This material was chromatographed on a 1 × 150 cm column packed with Sephadex LH–20 in methyl alcohol as described in Suda et al. (supra). Eight 2.5 ml fractions were collected and 5 μl of each fraction was counted to determine the elution position of peak V material. The peak V fractions were combined and evaporated on a flash evaporator, essentially 100 percent of the 11 μg being recovered in 31 mg of oil.

The oil residue was dissolved in 0.15 ml of 65 percent $CHCl_3$ in Skellysolve B and chromatographed on a 1 × 150 cm column packed with Bio Beads SX–8 (a porous crosslinked polystyrene polymer marketed by Bio Rad Laboratories, Richmond, California) in 65 percent $CHCl_3$ in Skellysolve B. Fifty 2.5 ml fractions were collected and 5 μl of each fraction was counted to determine the elution position of peak V material. The collection tubes which contained 8 μg peak V were recombined, dried and dissolved in 0.2 ml of 65 percent $CHCl_3$ in Skellysolve B. The resulting material was applied to a 1 × 100 cm column packed with Sephadex LH–20 in 65 percent $CHCl_3$ in Skellysolve B and the peak V material was recovered.

The 8 μg peak V isolate was then reacted with 10 μl TBT (a special combination of TMS-Imidazole, Bis-TMS-Acetamide and Trimethyl-chlorosilane marketed by Pierce Chemical Co., Rockford, Ill.) in 10 μl of pyridine for 10 minutes. The resulting tri-trimethyl silyl ether derivative was chromatographed on a 1 × 60 cm column packed with 18 g Sephadex LH–20 in 50 percent $CHCl_3$ in Skellysolve B. The tri-trimethyl silyl ether derivative was desilylated in 100 μl 0.00036 percent HCl in MeOH + 50 μl pyridine at 60° C for 4 hours. The disilyl ether, monsilyl ether and unsilylated products in 50 percent $CHCl_3$ in Skellysolve B were separated on a 1 × 60 Sephadex LH–20 column in 50 percent $CHCl_3$ in Skellysolve B. The unsilylated peak V and monotrimethyl silyl ether derivative of the peak V isolate were separately chromatographed on a 1 × 60 cm MeOH Sephadex LH–20 column and the derivatives and desilylated peak V isolate were prepared for mass spectrometry.

IDENTIFICATION

The structure of the recovered peak V isolate was established by means of mass spectra obtained with an Associated Electrical Industries mode MS—b 9 -L spectrometer and was based upon the following evidence: the mass spectrum of the isolate exhibited a molecular ion at m/e 416, requiring the incorporation of two addition oxygen atoms into the basic vitamins $D_3$ (cholecalciferol) carbon skeleton. The presence of three hydroxy functions in the isolate was demonstrated by the formation of a tri-trimethylsilyl ether derivative MW=632.

The mass spectrum of both the tri-trimethylsilyl ether derivative and the mono-trimethylsilyl ether derivative (MW=488; produced from the tri-trimethylsilylated compound by partial desilylation) and the trimethylsilyl ether-diacetate exhibited an intense peak at m/e 131, which established the presence of an hydroxy-function at C–25. In addition, the mass spectrum of the mono-trimethylsilyl ether compound showed peaks at m/e 152 and 134 (152-18) which correspond to the characteristic ions at m/e 136 and 118 in the spectra of cholecalciferol, 25-hydroxycholecalciferol and other cholecalciferol metabolites.

Since the ions at m/e 136 and 118 (136-18) are known to derive from ring A of the basic vitamin D skeleton, the shift of these ions by 16 m.u. (i.e., 136 = 16 = 152; 118 = 16 = 134) in the mass spectrum of the mono-trimethylsilyl ether derivatives of the peak V isolate established the presence of an additional hydroxyl function in ring A. The same peaks (152, 134) are observed also in the mass spectrum of the peak V isolate, whereas in the mass spectrum of the tri-trimethylsilyl ether derivative these peaks are shifted to m/e 296 (152 + 2 silyl groups) and 206 (296-$HOSi(CH_3)_3$). In addition to providing conclusive proof for the presence of two hydroxy functions in ring A, the peaks at m/e 152 and 134 (and 296 and 206 in the case of the tri-trimethylsilyl ether derivative) also establish the existence of the triene double bond system in the peak V isolate since these mass spectral peaks are very characteristic for the vitamin D-type triene structure. Ultraviolet absorption at 265 nm provided further strong evidence for a cis-triene system. For the position of the additional hydroxy-function in ring A carbons 1,2 or 4 are thus the only possibilities. The presence of a C-1 hydroxy group was established by the following experiments: catalytic reduction ($PtO_2/H_2$) of the peak V isolate yielded a product which was shown to be identical (by co-chromatography) with 25-hydroxyhexahydrocholecalciferol. Since formation of 25-hydroxyhexahydrocholecalciferol from the isolate requires hydrogenalysis of an hydroxy group, the hydroxyl function lost in this process must have been located at either C-1 or C-4 (i.e., allylic to the double bond system). The failure of the isolate to react with periodate eliminates a C-4 hydroxyl group and thus demands that the additional hydroxy group be placed at carbon 1. The observation that the biosynthesis of this isolate from 1,2 ditritiocholecalciferol results in the loss of one atom of tritium provides corroborative evidence for a C-1 hydroxy compound. The data above thus establish structure of the isolate as 1,25-dihydroxycholecalciferol.

Observations and deductions are based in part on earlier work by Suda et al in Biochemistry 8, 3513 (1969), Biochemistry 9, 2917 (1970) and Biochemistry 9, 4776 (1970) and by Blunt et al in Biochemistry 7, 3317 (1968).

BIOLOGICAL ACTIVITY

Line test assay

Weanling rats were fed the rachitogenic diet of Steenbock and Black, J. Biol. Chem. 64, 263 (1925) for 21 days ad libitum. The diet was modified with added crystalline water-soluble vitamins as described in Suda et al., J. Nutr. 100, 1049 (1970). After the 21 day depletion period a single 4 IU dose (260 p moles) of either standard vitamin $D_3$, 25-hydroxycholecalciferol (25-HCC) or the peak V isolate was administered intrajugularly in 0.02 ml of 95 percent ethanol. Controls received only 0.02 ml of 95 percent ethanol. Seven days later the rats were killed and the line test performed on sectioned radii and ulnae of individual rats. The biological activity was ascertained as described in U.S. Pharmacopeia, 14th revision (Mack Publishing Co., Easton, Pa. (1955)) with the following results which represent the average values from seven animals in each case:

| Compound | Activity in IU/nanomole* |
| --- | --- |
| Vitamin $D_3$ | $15.4 \pm 0.1^a$ |
| 25-HCC | $21.5 \pm 0.1$ |
| peak V isolate (1,25-dihydroxycholecalciferol) | $8.1 \pm 0.2$ |
| Control | 0 | a = standard error
*IU/nm = International unit of antirachitic activity per nanomole of compound It is evident from the foregoing that the peak V isolate does have antrirachitic activity although it is also evident that in normal situations 25-HCC would be the obvious choice for administration because of its greater activity as shown by the line test above. However, the line test assay is based upon the entire effect of the administered substance and thereby measures the total effect of the vitamin or isolate in inducing calcification. As will be shown below, the peak V isolate acts much more rapidly than 25-HCC or vitamin $D_3$ in stimulating intestinal calcium transport. Its effect is, however, of shorter duration whereas those of vitamin $D_3$ and 25-HCC are of longer duration which is evident in the line test results. Because of the rapid action of the peak V isolate in inducing calcium absorption in the intestine it may be the material of choice for administration where such rapid response appears significant in the treatment of rickets or other diseases which respond to vitamin therapy such as chronic renal disease, familial hypophosphatemic vitamin D resistant rickets and pseudo vitamin D deficiency disease.

Intestinal calcium absorption

The enhancement of intestinal calcium absorption in vitamin D repleted chickens was the basis of the bio-assay. Calcium (i.e. $^{45}Ca$) absorption was estimated by using a duodenal loop in situ method. Vitamin D-deficient chicks weighing between 170 and 190 g were dosed (oral or iv) with 25-HCC, vitamin $D_3$ or peak V metabolite at various time periods prior to experimentation. Chicks were fasted 15 hours before experimentation and then anesthetized with chloral hydrate (35 mg/100 g body weight, im). A 10 cm portion of the duodenal loop was ligated and its lumen rinsed with 5 ml of a phosphate-free bicarbonate solution (120 mM NaCl, 4.9 mM KCl and 9.2 mM NaHC)$_3$; pH adjusted to 7 with $CO_2$) after which the proximal ligature was tied off. The distal ligature was tightened around a blunted 18 ga needle through which 0.2 ml of $^{45}Ca$ phosphate-free bicarbonate solution (0.5 $\mu$Ci $^{45}Ca$/ml; 10 mM $CaCl_2$) was injected into the lumen of the duodenal loop. Following withdrawal of the needle the ligature was secured and the loop replaced in the peritoneal cavity for 30 minutes at which time the animal was killed. The loop was rapidly excised and subsequently dry-ashed in porcelain crucibles at 600° for 48 hours. The ashed product was dissolved in 2 N HCl, neutralized with 2 N Tris and 0.05 ml aliquots spotted on filter paper discs (2.3 cm diameter). Radioactivity was estimated by placing the paper disc in a 20 ml scintillation counting vial, adding 10 ml of toluene counting solution (Neville et al., Biochemistry 5, 2201, 1966) and counting in a Tri-Carb liquid scintillation spectrometer (model 3375). Results were expressed as % $^{45}Ca$ absorption and were calculated using the following formula:

$$\%^{45}Ca_{Abs} = \left[1 - \frac{^{45}Ca_R}{^{45}Ca_A}\right] (100)$$

where $^{45}Ca_R$ is the amount of $^{45}Ca$ remaining in the duodenal loop following the in situ incubation and $^{45}Ca_A$ is the amount of $^{45}Ca$ initially added to the loop preparation.

Figure 3:
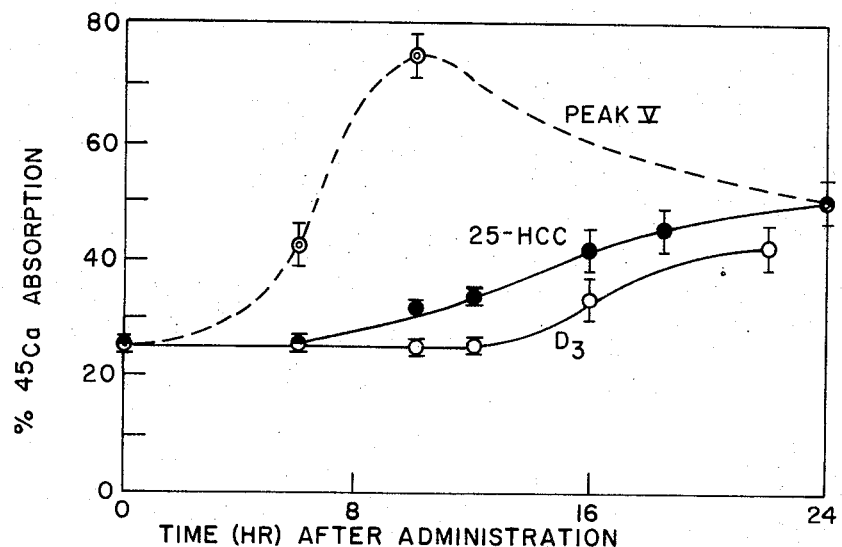
FIG. 3 represents the response of chick intestinal calcium absorption to 25–HCC, vitamin $D_3$ and the peak V isolate.

The in situ method for detection of changes in calcium absorption proved to be quite sensitive as is evident from FIG. 3. As little as 188 p moles of 25-HCC gave a significant increase in calcium absorption. Unidirectional movement of calcium (i.e., blood to intestine) ranged between 0.7 and 1.4 percent of the calcium placed in the intestine, a factor which added negligible error to the calculations. A time course profile of calcium absorption was obtained for vitamin $D_3$, 25-HCC and the peak v isolate. This is shown in FIG. 3. It was observed that the effect of 25-HCC preceeded that of vitamin $D_3$ by approximately 5 hours, both compounds demonstrating similar calcium absorption profiles. The peak V isolate, however, demonstrated strikingly novel characteristics by superseding 25-HCC in brevity of lag time and extent of response of calcium absorption. The peak V isolate gave a maximal response at approximately 10 hours, which was twice the maximal response of 25-HCC as measured at 24 hours and then declined until equal in activity to 25-HCC at 24 hours.

Bone mineral mobilization

Male weanling rats house in individual hanging wire cages were fed ad libitum the low calcium vitamin D deficient diet described in Suda et al., J. Nutr 100, 1049 (1970) for 3–4 weeks except that calcium was eliminated from the diet.

The low-calcium, vitamin D-deficient rats were injected intravenously with 0.02 ml of ethanol containing 65 p moles of either 25-HCC or the peak V isolate. Controls received 0.02 ml of ethanol carrier. Blood samples were taken at 6, 24, 48, 72 and 96 hours for calcium determination.

Calcium was estimated using atomic absorption spectrophotometry (Perkin-Elmer Model No. 214). Serum samples (0.05 ml) were dissolved in 2 ml of 0.1 percent $LaCl_3$ and assayed directly for calcium. Blank and standard solutions were made to approximate diluted serum by the addition of NaCl (3.42 mM) and KCl (0.19 mM).

Figure 4:
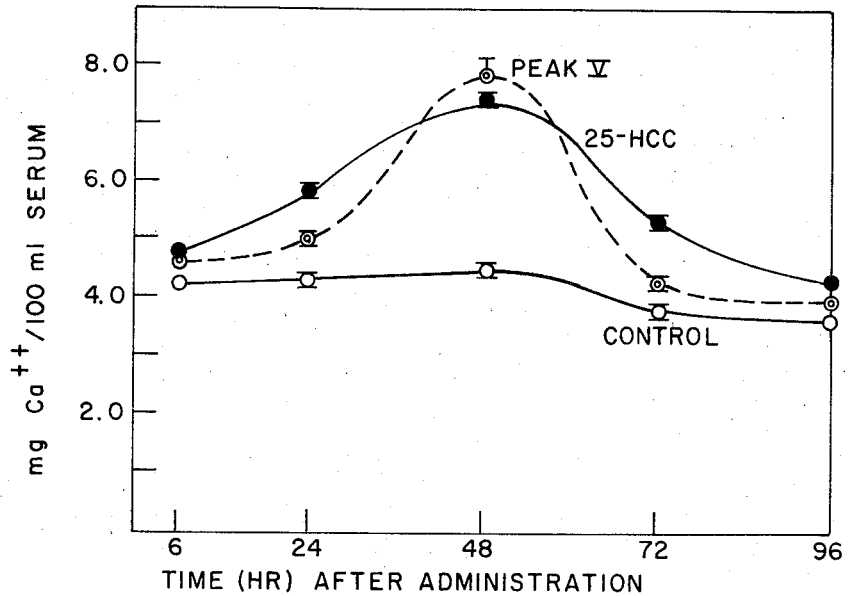
FIG. 4 represents the plasma calcium response of vitamin D-deficient rats on a low calcium diet to 25–HCC and the peak V isolate with each point representing four to six animals.

Serial blood samples showed a significant rise in serum calcium at 24 hours and 72 hours for both the 25-HCC and the peak V isolate as is shown in FIG. 4. The serum calcium showed a maximal increase of approximately 3 mg/100 ml serum for both 25-HCC and the peak V isolate when measured at 48 hours whereas at 96 hours both groups had returned to control levels. Thus, it is evident that peak V isolate does possess bone mobilizing activity.

Such activity suggests the application of the peak V isolate, 1,25-dihydroxycholecalciferol, where cases of hypoparathyroidism are encountered.

Having thus described the invention what is claimed is:

1. 1,25-dihydroxycholecalciferol.

* * * * *